United States Patent [19]

Campagnolo

[11] Patent Number: 5,791,195
[45] Date of Patent: Aug. 11, 1998

[54] CHANGE CONTROL DEVICE FOR A BICYCLE, PARTICULARLY A MOUNTAIN-BIKE OR THE LIKE

[75] Inventor: Valentino Campagnolo, Vicenza, Italy

[73] Assignee: Campagnolo S.r.l., Vicenza, Italy

[21] Appl. No.: 731,731

[22] Filed: Oct. 21, 1996

[30] Foreign Application Priority Data

Oct. 19, 1995 [IT] Italy .................................. TO95A0845

[51] Int. Cl.⁶ .......................... B62M 25/04; B62K 11/14; B62K 23/06
[52] U.S. Cl. .......................... 74/473.14; 74/142; 74/489; 74/502.2; 74/473.28; 116/28.1
[58] Field of Search .......................... 74/142, 143, 475, 74/489, 502.2, 473.14, 473.28; 116/28.1

[56] References Cited

U.S. PATENT DOCUMENTS 5,012,692  5/1991  Nagano .................................. 74/475

*Primary Examiner*—Allan D. Herrmann
*Attorney, Agent, or Firm*—Sughrue, Mion, Zinn, Macpeak & Seas, PLLC

[57] ABSTRACT

A speed change control device for a bicycle, particularly a "mountain-bike" comprises two actuating levers, respectively for controlling down-shifting of the bicycle chain on rear sprockets or front gears of smaller diameter and up-shifting of the chain on sprockets or gears of greater diameter. The control levers are movable in two planes parallel and closed to each other, which are arranged below the handlebar, out of the interference therewith, in the mounted condition of the device on the handlebar. The device further includes a return spring for the rotor on which the flexible control cable is wound, which exerts an action opposite to that of the return spring associated with the rear or front derailleur to which the control cable is connected.

9 Claims, 3 Drawing Sheets

CHANGE CONTROL DEVICE FOR A BICYCLE, PARTICULARLY A MOUNTAIN-BIKE OR THE LIKE

BACKGROUND OF THE INVENTION

The present invention relates to a change control device for bicycles, particularly "mountain-bikes" or the like.

In his Italian patent application No. TO92A00316 filed Apr. 7, 1992, laid open to public inspection on Oct. 7, 1993, the Applicant has disclosed a change control device for a bicycle, particularly a "mountain-bike" or the like, comprising:

- a support body to be fixed to the bicycle handlebar,
- a rotor rotatably mounted on the support body and provided with means for winding a flexible cable controlling the change device,
- indexing means for defining a plurality of stable positions of the rotor, corresponding to the various speed ratios, said means comprising a toothed wheel fixed to the rotor and at least one resilient element carried by the support body and able to engage into the vanes between the teeth of the toothed wheel,
- a pair of ratchet devices associated with said rotor and controlled by two respective control levers, for causing the rotor to be rotated in the two directions of rotation respectively.

In the above described known solution, the two control levers of the device are arranged respectively adjacent to the two ends of the rotor, and, in the mounted condition on the handlebar, they are arranged above and below the handlebar, respectively. This arrangement has proved to be not completely satisfactory from the standpoint of easiness of operation and safety in travel, since it compels the cyclist to modify the position of his hand on the handlebar in order to operate the change device.

SUMMARY OF THE INVENTION

In order to overcome this drawback, the invention provides a device of the above indicated type, characterized in that said control levers have handling ends which are movable in two parallel and adjacent planes which, when the device is mounted on the bicycle handlebar, are both arranged below the bicycle handlebar so as to avoid interference with the latter. Thus, a longer travel of the levers is allowed with the resulting possibility of moving the bicycle chain over a plurality of sprockets with one operation.

According to a technique known per se, the control cable wound on the rotor is connected to a conventional derailleur including a movable body provided with a return spring which tends to bias the movable body towards one end position corresponding to the engagement of the bicycle chain on the rear sprocket (in the case of the rear derailleur), or on the front gear (in the case of the front derailleur) of smaller diameter.

According to a further important feature of the invention, the control device is further characterized in that between the support body and the rotor there are interposed spring means tending to exert on the rotor an action opposite to that exerted by the return spring of the derailleur through the control cable. Due to this feature, if the rotor were not held by said indexing means, it would reach a position intermediate the two end positions corresponding to the lower speed ratio and the higher speed ratio, respectively.

Therefore, the greatest effort which must be exerted by the user in order to actuate the device in the most unfavourable condition, is lower than the greatest effort which will be necessary in the conventional solutions in order to overcome the return spring of the derailleur. In other words, by using said spring means which partially balance the return action of the derailleur spring, actuation of the rotor by the cyclist is easier and more convenient.

Yet a further important feature of the invention lies in that with the rotor there are associated means for displaying the selected speed ratio, comprising a display reference element slidably mounted within an arched slot of the support body and connected to a pin which is slidably radially guided with respect to the rotor body. In this manner, the angular oscillation of the rotor causes a corresponding sliding movement of the display reference element within said arched slot even if the latter has a curvature with a centre spaced apart from the rotor axis.

BRIEF DESCRIPTION OF THE DRAWINGS

The invention will be now described with reference to the annexed drawings given purely by way of non-limiting example, in which.

DETAILED DESCRIPTION OF THE INVENTION

Figure 1:
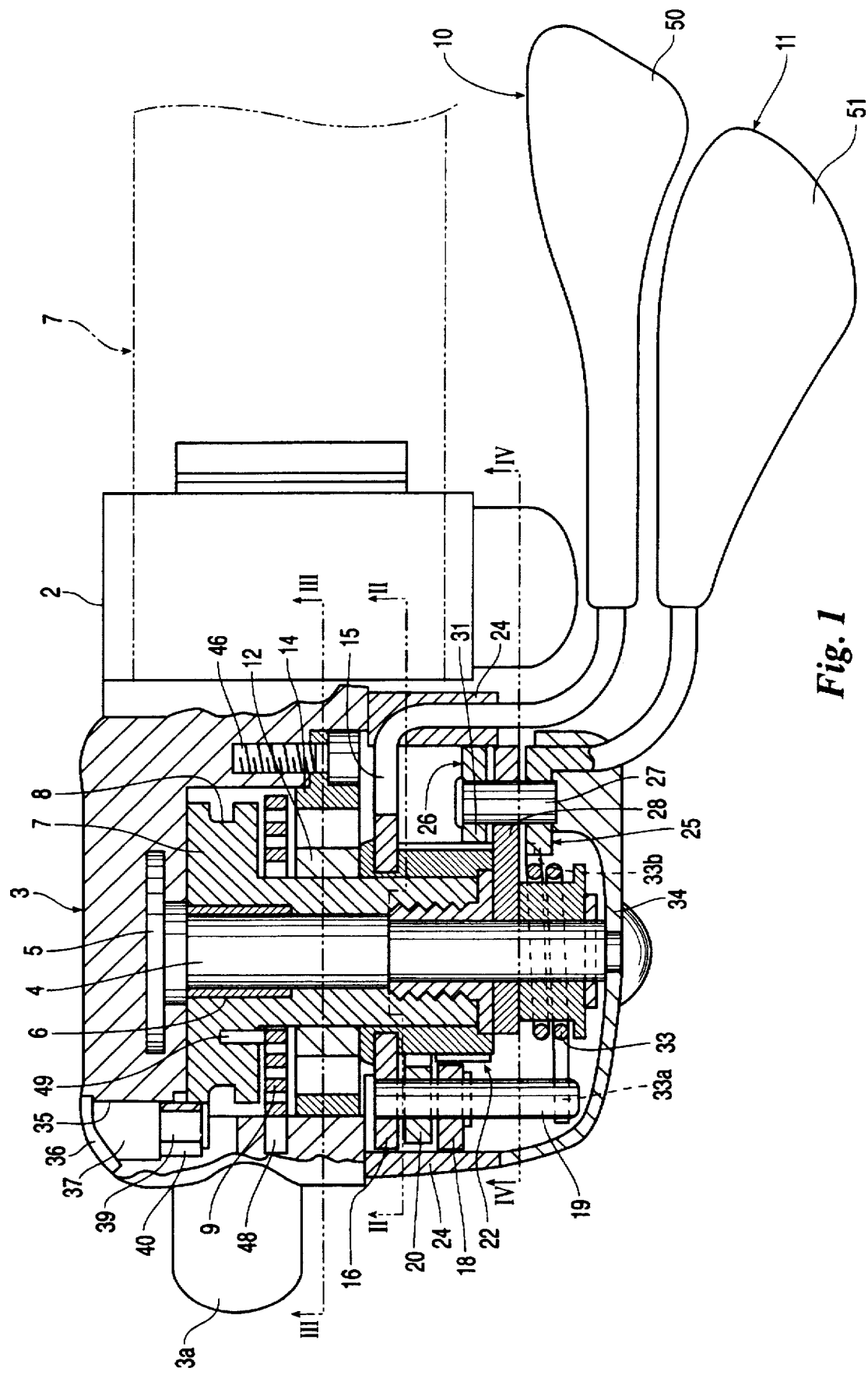
FIG. 1 is an elevational view of a control device according to the invention.

In the drawings, by dotted line there is indicated a portion of a handlebar 1 of a mountain-bike on which there is clamped, in a way known per se, a sleeve 2 connected to a support body 3. The drawings do not show the details of sleeve 2 since the latter may be made in any known way, according to an art conventional in the field of bicycles. The body 3 of plastic material carries a shaft 4 whose upper end 5 is embedded within body 3 when the latter is moulded.

In the present description, and in the following claims, the terms "upper" and "lower" are used with reference to the position of the device in the mounted condition on the bicycle, with the bicycle itself being in an operative position.

On shaft 4 there is rotatably mounted by means of a bush 6 a rotor 7 having a circumferential groove 8 for winding a flexible metal cable (not shown in the drawings) which projects from body 3 at a nose 3a thereof (FIG. 5) and is connected to a conventional front or rear derailleur device of the bicycle, which on its turn is provided with the conventional return spring which tends to hold the movable body of the derailleur in the position corresponding to engagement of the bicycle chain on the smallest diameter sprocket or gear.

According to a feature of the invention, between the rotor 7 and the support body 3 there is interposed a spiral spring 9 which exerts on the rotor a biasing action opposite to that exerted by the return spring of the derailleur. The spring 9 is provided with end tails 48 and 49 anchored to the support body 3 and the rotor 7, respectively. As already indicated above, a decrease of the maximum effort requested to the cyclist, in the most unfavourable condition, to cause a rotation of the rotor, is thereby obtained.

In order to cause the rotation of the rotor in the two directions of rotation, respectively, there are provided two control levers 10, 11 which control two respective ratchet devices associated with rotor 7.

As clearly shown in FIG. 1, the arrangement of said ratchet devices is such that the two handling ends 50 and 51 of levers 10, 11 are in positions close to each other and both below the handlebar 1, in the mounted condition of the device on the handlebar, whereby they can be easily controlled by the cyclist without modifying the position of the hand on the handlebar and without any interference with the handlebar itself. The details of said ratchet devices will be described hereinafter.

Figure 3:
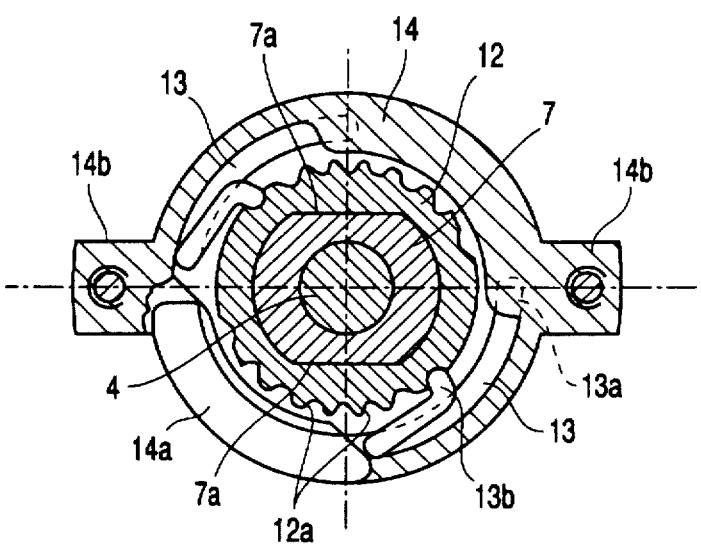

In order to provide a snap reference of the various operative positions of rotor 7 corresponding to the selection of the various speed ratios, there are provided indexing means, comprising a toothed wheel 12 rotatably connected to rotor 7 (see also FIG. 3) and co-operating with two pin springs 13 which are fixed at diametrically opposite positions inside a ring 14 provided with ears 14b which are fixed to the support body 3 by screws 46 (only one of which is visible in FIG. 1). The toothed wheel 12 is rotatably connected to rotor 7 since the latter has two planner opposite faces 7a and the toothed wheel 12 has a central aperture with a profile corresponding to the resulting profile of rotor 7 in cross-section. Each pin spring 13 has a fixed portion ending with one end 13a anchored within a corresponding inner cavity of ring 14, and a flexible portion 13b ending with a free end able to engage selectively the vanes 12a of toothed wheel 12 in order to provide a snap reference of the various operative positions of rotor 7. Ring 14 further has on its circumferential edge a portion 14a extending axially downwardly (not shown in FIG. 1) which acts as stop element, as it will be clearly apparent in the following.

Figure 4:
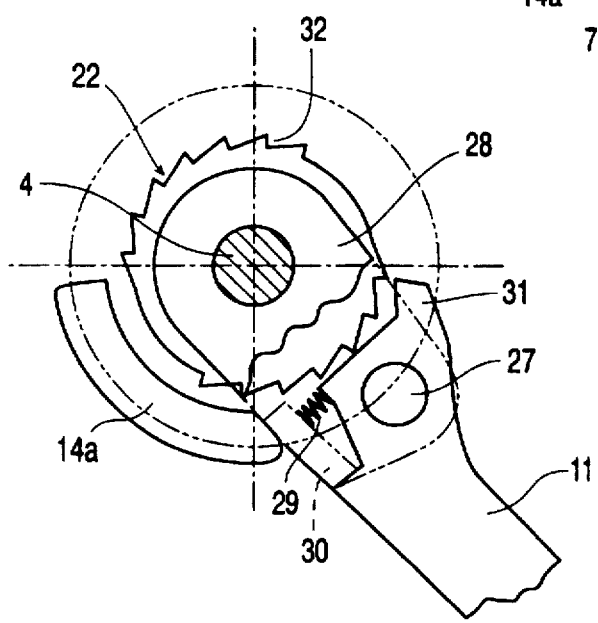

A first control lever 10 is to control the derailing of the bicycle chain from a sprocket of greater diameter to a sprocket of smaller diameter in the sprocket unit associated with the rear wheel of the bicycle (in case the illustrated device is used to control the rear derailleur) or from a toothed crown of greater diameter to a toothed crown of smaller diameter of the crowns associated with the pedal arms (in case the illustrated device is used to control the front derailleur). The control lever 11 serves instead for causing the raise of the chain from smaller sprockets to greater sprockets or from smaller crowns to greater crowns. The control lever 10 for downshifting of the chain is actuated by pulling it towards the viewer, out of the plane of the sheet of FIG. 1 (clockwise rotation in FIG. 2) whereas control lever 11 is actuated by pushing it towards the plane of the sheet of FIG. 1 (anti-clockwise rotation with reference to FIG. 4). As it will be clearly apparent in the following, upon each actuation, both lever 10 and lever 11, return to their starting position.

Lever 10 is connected in one piece to a plate 15 which is freely rotatably mounted around rotor 7 and has a portion 16 diametrically opposite to lever 10 from which there extends a wall 17 orthogonal to plate 15, which on its turn further extends into a further wall 18 parallel and spaced from plate 15. The plate portion 16 and the facing wall 18 are used to rigidly support a pin 19 on which there is freely rotatably mounted a pawl 20 able to co-operate with first teeth 21 of a toothed wheel 22 rigidly mounted on rotor 7 and biased by a spring 23 interposed between pawl 20 and wall 17 towards a position in which it engages teeth 22. When lever 10 is held (by spring means which will be illustrated in the following) in the position shown in FIG. 2, the pawl 20 rests against an end of the fixed appendage 14a which keeps it spaced from teeth 21, against the action of spring 23.

To lever 10, which as shown already is rotatably mounted around the axis of rotor 7, there is rigidly connected a circular skirt 24 protecting the mechanism, which rotates along therewith.

Lever 11 has at its end opposite to its handing end a fork portion comprising two parallel and spaced apart walls 25, 26 between which there is rigidly connected a pin 27. By means of the pin 27, said fork end of lever 11 is articulated to a plate 28 which on its turn is freely rotatably mounted on shaft 4. A spring 29 is interposed between a wall 30, forming part of plate 28 and perpendicular to the general plane of this plate, and lever 11, so as to tend to keep a tooth 31 formed on the end of lever 11 (FIG. 4) spaced from second teeth 32 formed on the toothed wheel 22. When lever 11 is operated, it rotates in an anti-clockwise direction, with reference to FIG. 4, around the axis of pin 27, against the action of spring 29, so as to bring tooth 31 into engagement in a vane between the teeth 32, where upon the further rotation in an anti-clockwise direction of lever 11 causes a simultaneous rotation of lever 11, plate 28 and toothed wheel 22, which is connected to rotor 7.

Both lever 10 and lever 11 are biased upon each actuation thereof towards their starting position by spring means constituted by a single helical spring 33 having end tails 33a and 33b respectively connected to pin 19 and plate 25 so that spring 30 is operatively interposed between the two levers 10, 11. The use of a single return spring acting on both the control levers of the device, renders the manufacture and assembly of the device further simplified, more reliable and of more reduced cost.

The operation of the above described control device is the following.

Figure 2:
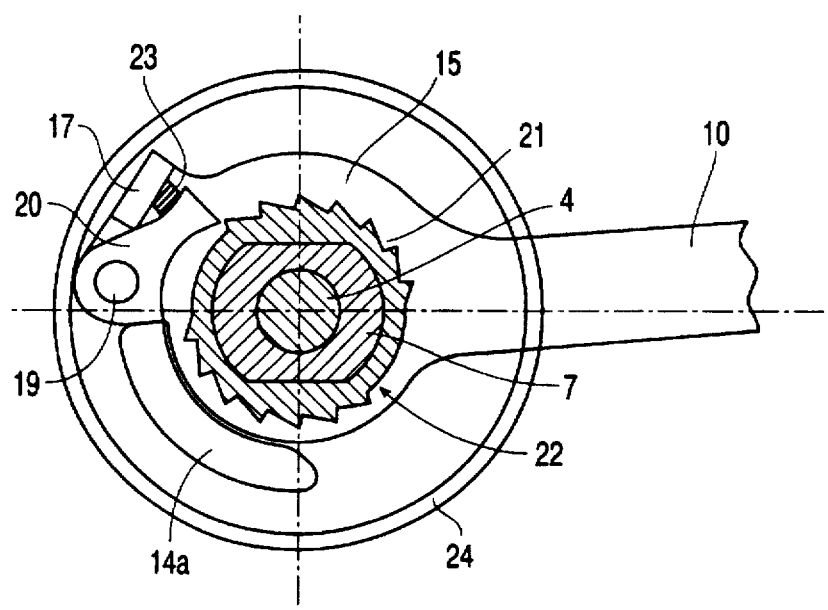
FIGS. 2–4 are cross-sections taken along lines II—II, III—III and IV—IV of FIG. 1.
Figure 5:
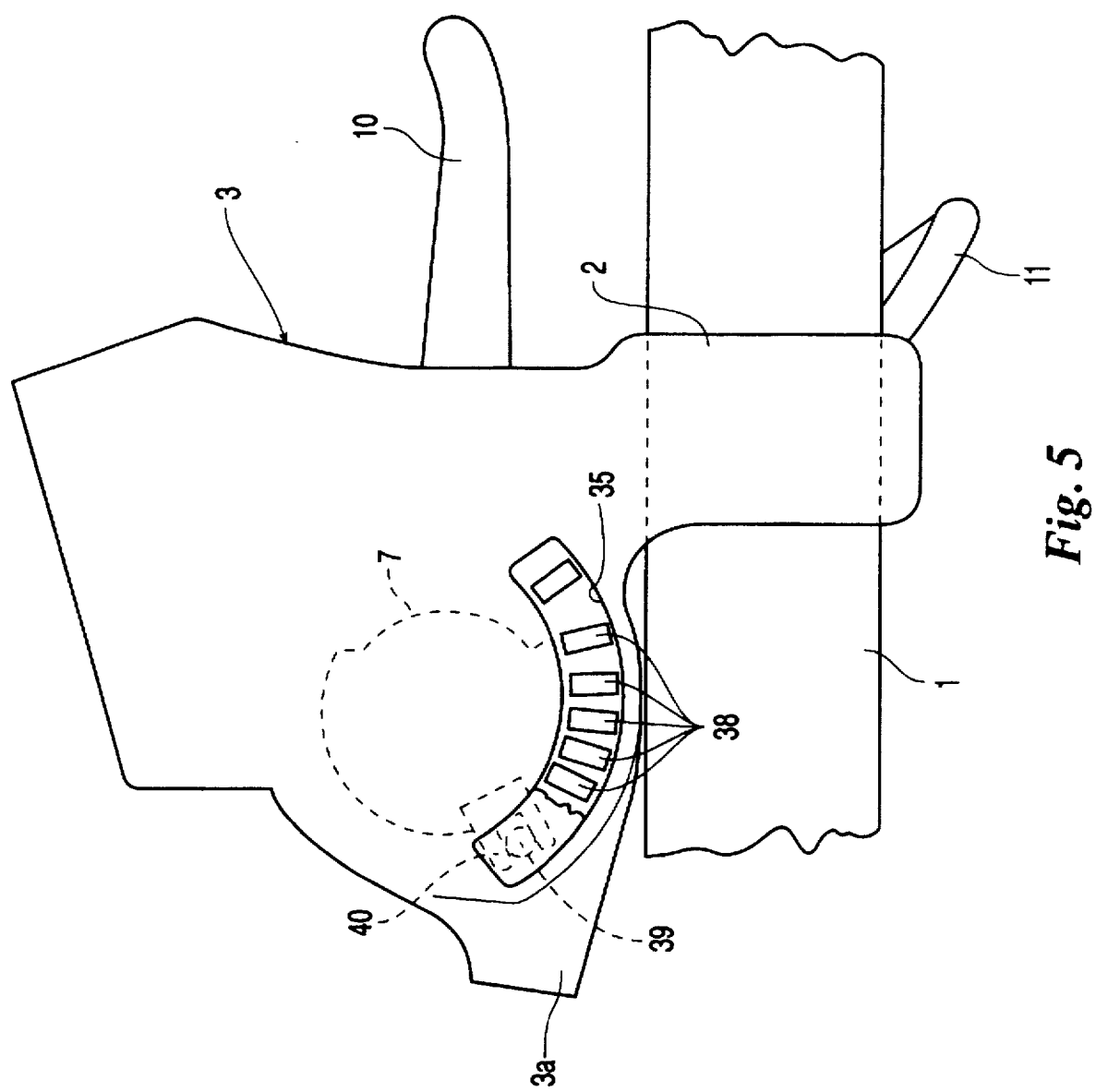
FIG. 5 is a plan view of the device of FIG. 1.

If one wishes to cause a down-shifting of the bicycle chain towards smaller sprockets (in the case of a rear derailleur control) or smaller toothed crowns (in case of a front derailleur control), lever 10 is operated causing it to rotate in a clockwise direction, with reference to FIG. 2, i.e. by pulling it towards the viewer out of the plane of the sheet of FIG. 1. With reference to FIGS. 5, 6, which show the device mounted adjacent to the right end of the handlebar of a "mountain-bike", this can be done by the cyclist without modifying the position of his hand on the handlebar, by simply putting one or more fingers on the front part of lever 10 and pushing it rearwardly (i.e. downwardly with reference to FIG. 5). Upon each actuation, lever 10, if released, returns to its starting position and can be actuated again. Each oscillation of lever 10 can cause shifting of the chain over one or more sprockets or toothed crowns, as a function of the oscillation imported by the lever. With reference to FIG. 2, the clockwise rotation of lever 10 causes pawl 20 to move away from appendage 14a, so that pawl 20 is free to come into engagement, pushed by spring 23, with teeth 21 of toothed wheel 22. The latter is thus compelled to rotate, by causing a corresponding rotation of rotor 7, which causes the unwinding of the control cable from groove 8 and the resulting movement of the movable body of the derailleur. The greatest effort requested to the cyclist in order to operate the derailleur, in the most unfavourable condition, is lower than that requested in the conventional solutions, since the return force of the spring associated with the derailleur is at least partially compensated by the opposite action of the spiral spring 9. Each operative position of the rotor corresponding to the selection of a determined speed ratio is signalled by the snap engagement of pin springs 13b within the corresponding vanes 12a of toothed wheel 12. Upon each actuation, when the lever 10 is released, it returns to its starting position shown in FIG. 12, defined by the engagement of appendage 14a against the pawl 20, under the action of spring 33.

Similarly, when lever 11 is actuated by pushing it forwardly with the thumb of the end which holds the handlebar, towards the plane of FIG. 1, i.e. by rotating it in an anti-clockwise direction, with reference to FIG. 5, lever 11 rotates around the axis of pin 7 with respect to plate 28, bringing tooth 31 into engagement with teeth 32, whereupon it rotates along with plate 28 and wheel 22 causing a rotation of rotor 7 and the resulting winding of the control cable of the derailleur within groove 8. When lever 11 is released, spring 33 returns it to the starting position shown in FIG. 4, in which plate 28 abuts against the end of appendage 14a opposite to that which is used as stop element for pawl 20. Also in this case, during actuation of the lever, the various operative positions of the rotor are signalled by the snap engagement of pin springs 13b into the vanes of toothed wheel 12.

As shown, both levers 10, 11 have handling ends which oscillate in parallel planes close to each other and both arranged below handlebar 11, out of the interference with the latter, so that these levers can be actuated easily by the cyclist without modifying the position of his hand on the handlebar. In this manner, a longer travel of the levers with a plurality of consecutive snap engagements is allowed with the resulting possibility of shifting the chain with a single operation over a plurality of sprockets.

Also with reference to FIG. 1, the device is protected at its lower part by a bottom wall 34, fixed to the lower end of shaft 4.

Yet according to the invention, in order to provide the cyclist with a display of the operative position of the device, the support body 3, has at its upper part an arched slot 35, closed by an upper transparent wall 36, and serving for guiding a display reference element 37 able to co-operate with a number of windows 38, identified by increasing numbers (not shown in the drawing). The presence of the display reference element 37 below one of windows 38 indicates to the cyclist the selection of the speed ratio corresponding to the number associated with the respective window. Since the arched slot 35 has a curvature with a centre spaced from the axis of rotor 4, the display reference element 37 is provided at its lower part with a cylindrical pin 39 which is slidably guided in radial direction within a C shaped appendage 40 of rotor 7.

As clearly apparent from the foregoing description, the device according to the invention enables the cyclist to actuate the control levers easily without modifying the position of his hand on the handlebar and therefore insuring a greater safety in travel. At the same time, the use of spring means which oppose the return action of the spring associated with the derailleur enables the greatest effort requested for actuating the device to be reduced. The structure of the device is also particularly simple and unexpensive and constituted by a reduced number of parts. Finally, the means for displaying the selected speed ratio are particularly simple and efficient.

A further feature of the device according to the invention lies in that, as shown in FIGS. 1, 5, the support body 3 of the device has its upper surface, adjacent to the upper end of the rotor 7, arranged close to the handlebar 1 and at a higher level with respect thereto, so that the display window 36 is arranged in a position which is ideal to enable an easy vision by the cyclist, without the need of using transmission devices which are instead necessary in the known solutions, in order to connect the display reference element to the control rotor, which in these known solutions (see for example EP-A-0 629 545) has its upper end arranged at a level lowered at the handlebar. The arrangement according to the invention is preferable also with respect to other known solutions (see for example EP-A-0 615 896) in which the display window is arranged below the handlebar and therefore is difficult to be seen by the cyclist.

Naturally, while the principle of the invention remains the same, the details of construction and the embodiments may widely vary with respect to what has been described and illustrated purely by way of example, without departing from the scope of the present invention.

What is claimed is:

1. Speed change control device for a bicycle, comprising:
    a support body, to be fixed to the bicycle handlebar,
    a rotor rotatably mounted on the support body and provided with means for winding a flexible cable for controlling the speed change,
    indexing means for defining a plurality of stable positions of the rotor corresponding to the various speed ratios, said means comprising a toothed wheel fixed to the rotor and at least one resilient element carried by the support body and able to engage into vanes between the teeth of the toothed wheel,
    a pair of ratchet devices associated with said rotor and controlled by two respective control levers, for causing rotation of the rotor in two directions of rotation, respectively,
    wherein said control levers have handling ends which are movable in two parallel and adjacent planes which, when the device is mounted on the bicycle handlebar, are both arranged below the bicycle handlebar out of the interference with the latter,
    wherein between the support body and the rotor there are interposed spring means tending to exert on the rotor an action opposite to that exerted by a return spring of a derailleur through the control cable and
    wherein said spring means are constituted by a spiral spring arranged in a plane perpendicular to the axis of the rotor and having end tails respectively anchored to said support body and said rotor.

2. Control device according to claim 1, wherein said support body is made of plastic material and said rotor is freely rotatably mounted on a metal shaft having one head embedded within the body of plastic material.

3. Control device according to claim 2, wherein a first control lever, which is for controlling down-shifting of the bicycle chain on sprockets or gears of smaller diameter, is mounted so as to oscillate in a plane arranged above the plane of oscillation of the second control lever, in the mounted condition of the device on the handlebar, said second control lever being for causing up-shifting of the chain on sprockets or gears of greater diameter.

4. Control device according to claim 3, wherein said first control lever is freely rotatably mounted around the axis of said rotor and is rigidly connected to a cylindrical skirt for protection of the inner mechanisms of said device.

5. Control device according to claim 4, wherein said first control lever is connected to a plate which is freely rotatably mounted around the axis of said rotor and pivotally supports on its turn a control pawl at an area which is diametrically opposite to the first control lever, said control pawl being normally pushed by spring means into engagement with a first ratchet wheel and being held disengaged from said first ratchet wheel, against the action of said spring means, by a stop element, when said first control lever is in a neutral position.

6. Control device according to claim 1, wherein said control levers are each biased by spring means towards an inoperative neutral position, wherein said spring means of the two control levers are constituted by a single spring interposed between said control levers.

7. Control device according to claim 3, wherein said second control lever is pivotally mounted around an axis spaced from the axis of the rotor, on an auxiliary plate which on its turn is freely rotatably mounted around the axis of said rotor, said second control lever being biased by spring means interposed between said second control lever and said auxiliary plate to an inoperative position, in which a ratchet tooth associated with the second control lever is spaced from a second ratchet teeth.

8. Control device according to claim 1, wherein means are associated with the rotor for displaying the selected speed ratio, comprising a display reference element slidably mounted within an arched slot of the support body and connected to a pin which is slidably and radially guided with respect to the body of the rotor.

9. Control device according to claim 8, wherein said support body has its upper end provided with said display slot arranged at a lever higher than the handlebar in the mounted condition of the device on the handlebar, so as to be easily seen by the cyclist, said rotor having its upper end immediately adjacent to said slot.

* * * * *